United States Patent [19]
Carlson

[11] 3,903,443
[45] Sept. 2, 1975

[54] ELECTRIC MOTOR CONSTRUCTION
[75] Inventor: Van Carlson, Owosso, Mich.
[73] Assignee: Universal Electric Company, Owosso, Mich.
[22] Filed: May 22, 1974
[21] Appl. No.: 472,295

[52] U.S. Cl. .................. 310/91; 85/1 H; 248/16
[51] Int. Cl. ............................................ H02k 9/00
[58] Field of Search ......... 310/91, 273, 42, 272, 89, 310/258, 66, 51, 254, 67, 71; 85/1 H; 248/13, 16, 17, 26, 27

[56] References Cited
UNITED STATES PATENTS

| | | | |
|---|---|---|---|
| 1,674,302 | 6/1928 | Royle | 248/16 |
| 2,465,042 | 3/1949 | Schlenker | 310/89 |
| 2,856,785 | 10/1958 | Steele | 248/16 |
| 3,041,023 | 6/1962 | Odlum | 248/16 |
| 3,306,601 | 2/1967 | Mitchell | 248/16 |
| 3,664,434 | 5/1972 | Connor | 85/1 H |

FOREIGN PATENTS OR APPLICATIONS

| | | | |
|---|---|---|---|
| 811,000 | 7/1949 | Germany | 248/16 |
| 576,676 | 3/1958 | Italy | 85/1 H |

Primary Examiner—R. Skudy
Attorney, Agent, or Firm—Barnes, Kisselle, Raisch & Choate

[57] ABSTRACT

An electric motor comprising a shell, end members closing the ends of said shell, a stator mounted in said shell, and a rotor rotatably mounted in said end members. The shell has a plurality of circumferentially spaced axially extending slots therein adjacent each end member. A lug is associated with at least some of said slots, and has an opening therein aligned with the opening in the shell. An elongated fastener having an enlarged elongated head and a shoulder adjacent the head is provided for each lug such that the fastener can be inserted by axially aligning the head with a slot, moving the fastener radially inwardly through said slot, and thereafter rotating the fastener to cause the shoulder to engage the sides of the slot in said shell. The fastener has a portion thereof extending through the opening in the lug. A nut is threaded on the fastener to hold the fastener and the lug in position.

14 Claims, 8 Drawing Figures

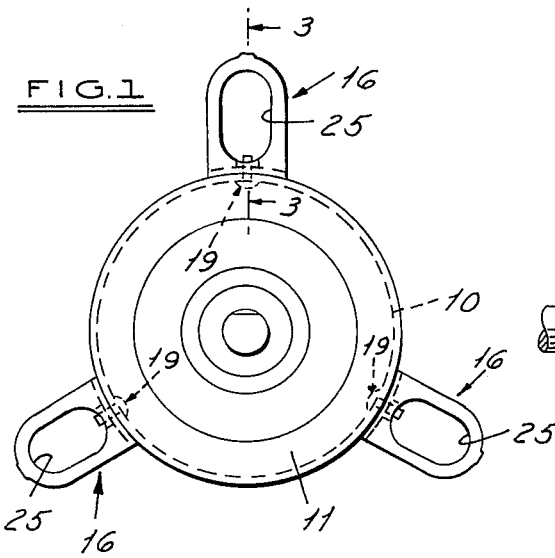
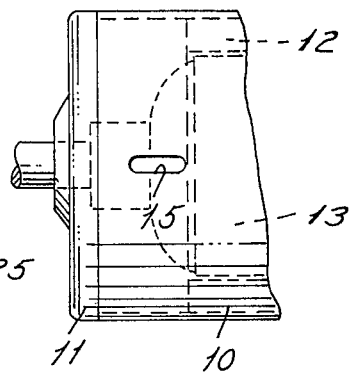
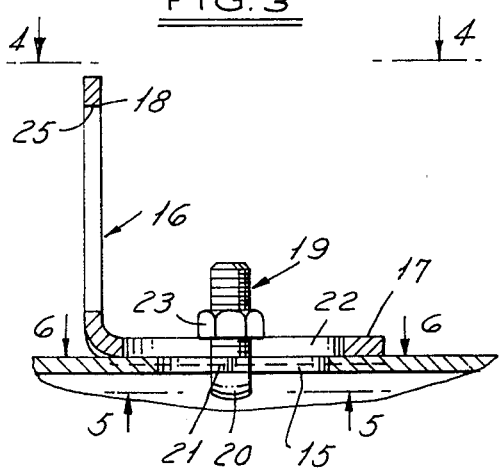
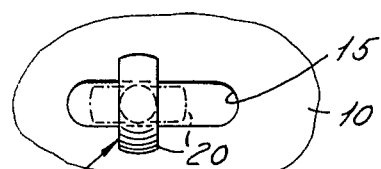
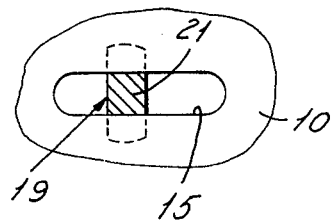
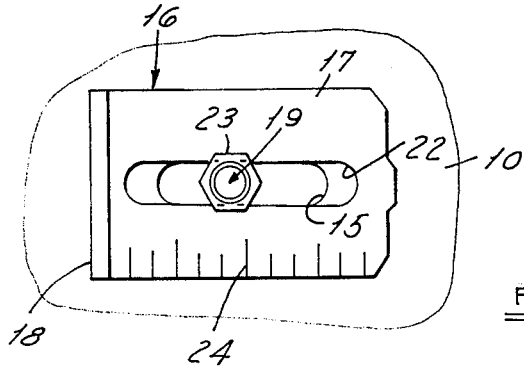
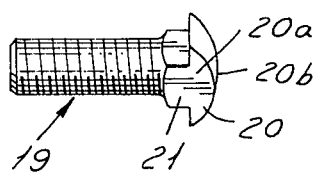
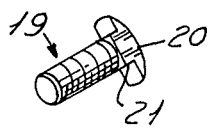

ELECTRIC MOTOR CONSTRUCTION

This invention relates to electric motors and particularly to electric motor construction.

BACKGROUND OF THE INVENTION

In the manufacture of electric motors, it is common to provide lugs thereon for mounting the motor. Since the lugs are in fixed position, it is essential that users maintain an inventory of motors with various lug arrangements in order to accommodate various types of mounting of the motors. This is not only expensive in terms of inventory but takes up room in storage and makes flexibility in mounting, as may be required in the field, difficult.

Accordingly, among the objects of the invention are to provide an electric motor construction including mounting lugs which may be selectively mounted and are adjustable as desired to accommodate varying requirements.

SUMMARY OF THE INVENTION

In accordance with the invention, the electric motor comprises a shell, end members closing the ends of said shell, a stator mounted in said shell, and a rotor rotatably mounted in said end members. The shell has a plurality of circumferentially spaced axially extending slots therein adjacent each end member. A lug is associated with at least some of said openings and has an opening therein aligned with the opening in the shell. An elongated fastener having an enlarged head and a shoulder adjacent the head is provided for each lug such that the fastener can be inserted by axially aligning the head, moving the fastener radially inwardly and thereafter rotating the fastener to cause the shoulder to engage the sides of the opening in the shell. The fastener has a portion thereof extending through the opening in the lug. Means are provided for engaging the fastener to hold the fastener and the lug in position.

DESCRIPTION OF THE DRAWINGS

FIG. 1 is an end view of an electric motor embodying the invention.

FIG. 2 is a fragmentary side elevational view of the same parts being broken away.

FIG. 3 is a fragmentary sectional view taken along the line 3—3 in FIG. 1.

FIG. 4 is a fragmentary view taken along the line 4—4 in FIG. 3.

FIG. 5 is a fragmentary sectional view taken along the line 5—5 in FIG. 3.

FIG. 6 is a fragmentary sectional view taken along the line 6—6 in FIG. 3.

FIG. 7 is a side elevational view of a fastener used in the invention.

FIG. 8 is a perspective view of the fastener shown in FIG. 7.

DESCRIPTION

Referring to FIGS. 1 and 2, the electric motor embodying the invention comprises a cylindrical shell 10 made of sheet metal, end members 11 fixed to the shell 10 in a suitable fashion such as that shown, for example, in U.S. Pat. No. 3,567,973. A stator 12 is mounted in the shell and a rotor 13 is rotatably mounted in the end members by bearings (not shown).

In accordance with the invention, circumferentially spaced axially extending slots 15 are provided adjacent each end member in the shell. A plurality of lugs 16 are provided with the motor and are adapted to be mounted as presently described to accommodate varying mounting arrangements. Each lug includes a base 17 which is transversely curved to correspond with the curvature of the exterior of the shell 10 and a leg 18 that extends radially outwardly when the lug is in position.

An elongated fastener 19 in the form of a bolt having an enlarged elongated head 20 is provided. The width of the head 20 is slightly less than the width of the elongated openings or slots 15 to permit insertion through the slots 15 and rotation within shell 10 so that the fastener 19 cannot be withdrawn. Adjacent the head, the shank of the fastener is square as at 21 to form a shoulder that has a width substantially equal to the width of the openings 15. The remainder of the shank is threaded and is adapted to extend through an opening 22 in the base 17 of each lug and fastener means in the form of a nut 23 is threaded thereon to hold the lug 16 in position. Opening 22 is elongated and indicia 24 are provided along the length thereof so that the lug 16 can be located axially as desired. The head 20 has flat sides 20a coplanar with two of the sides of shank 21. The end 20b of head 20 is arcuate in planes parallel to sides 20a. Each leg is provided with an opening 25 to accommodate mounting bolts.

By the above arrangement, lugs 16 can be provided at any one of the slots 15 with the leg 18, near or far from the end members 11. The elongated slot 15 in the shell and openings 22 in the lug provide substantial accommodation for varying mounting arrangements. By having the leg 18 near the center of the shell longitudinally thereof, a center rather than end mount arrangement of the motor can be made.

I claim:

1. In an electric motor, the combination comprising a shell,
end members closing the ends of said shell,
a stator mounted in said shell,
and a rotor rotatably mounted in said end members,
said shell having a plurality of circumferentially spaced axially extending slots therein adjacent each end member,
lugs associated with at least some of said openings,
each said lug having an opening therein aligned with a slot in said shell,
an elongated fastener having an enlarged elongated head and a shoulder adjacent said head such that the fastener can be inserted by axially aligning said head with a slot, moving said fastener radially inwardly through said slot, thereafter rotating said fastener to cause said shoulder to engage the sides of said slot in said shell,
said fastener having a portion thereof extending through the opening in said lug,
and means engaging said fastener to hold said fastener and said lug in position.

2. The combination set forth in claim 1 wherein said opening in said lug is elongated.

3. The combination set forth in claim 2 wherein said lug is L-shaped including a base engaging said shell and having said opening of said lug therein and a leg extending radially outwardly.

4. The combination set forth in claim 3 wherein said base is transversely curved to correspond with the curvature of said shell.

5. The combination set forth in claim 4 including indicia extending axially along the opening in said base.

6. The combination set forth in claim 5 wherein said fastener has a square shank forming said shoulders.

7. In an electric motor, the combination comprising
a shell,
end members closing the ends of said shell,
a stator mounted in said shell,
and a rotor rotatably mounted in said end members,
said shell having a plurality of circumferentially spaced axially extending slots therein,
lugs associated with at least some of said slots,
each said lug having an opening therein aligned with a slot in said shell,
an elongated fastener having an enlarged elongated head and a shoulder adjacent said head such that the fastener can be inserted by axially aligning said head with a slot moving said fastener radially inwardly though said slot, thereafter rotating said fastener to cause said shoulder to engage the sides of said slot in said shell,
said fastener having a portion thereof extending through the opening in said lug,
and means engaging said fastener to hold said fastener and said lug in position.

8. The combination set forth in claim 7 wherein said opening in said lug is elongated.

9. The combination set forth in claim 7 wherein said lug is L-shaped including a base engaging said shell and having said opening of said lug therein and a leg extending radially outwardly.

10. The combination set forth in claim 9 wherein said base is transversely curved to correspond with the curvature of said shell.

11. The combination set forth in claim 9 wherein said opening in said base is axially elongated and including indicia extending axially along the opening in said base.

12. The combination set forth in claim 9 wherein said fastener has a square shank forming said shoulders.

13. In an electric motor, the combination comprising
a shell,
end members closing the ends of said shell,
a stator mounted in said shell,
and a rotor rotatably mounted in said end members,
said shell having a plurality of circumferentially spaced axially extending slots therein,
a lug associated with at least some of said openings,
said lug having an opening therein aligned with an opening in said shell,
an elongated fastener having an enlarged elongated head and a shoulder adjacent said head such that the fastener can be inserted by axially aligning said head with a slot, moving said fastener radially inwardly through said slot thereafter rotating said fastener to cause said shoulder to engage the sides of the slot in said shell,
said fastener having a portion thereof extending through the opening in said lug,
and means engaging said fastener to hold said fastener and said lug in position,
said opening in said lug being elongated,
said lug being L-shaped including a base engaging said shell and having said opening of said lug therein and a leg extending radially outwardly,
said base being transversely curved to correspond with the curvature of said shell,
said fastener has a square shank forming said shoulders.

14. The combination set forth in claim 13 including indicia extending axially along the opening in said base.

* * * * *